United States Patent
Hamada

(10) Patent No.: US 6,915,131 B2
(45) Date of Patent: Jul. 5, 2005

(54) COMMUNICATING APPARATUS, COMMUNICATION SYSTEM, COMMUNICATING METHOD, AND STORAGE MEDIUM

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 09/728,643

(22) Filed: Dec. 1, 2000

(65) Prior Publication Data

US 2002/0034945 A1 Mar. 21, 2002

(51) Int. Cl.[7] .................................................. H04Q 7/20
(52) U.S. Cl. .............................. 455/435.1; 420/432.1; 420/552.1
(58) Field of Search .................... 455/435.1, 435.2, 455/418–420, 428–429, 436, 426.1, 432.1, 552.1, 524–525, 456.6, 435, 552, 432, 456.5; 370/328, 331

(56) References Cited

U.S. PATENT DOCUMENTS

| | | | | |
|---|---|---|---|---|
| 5,195,127 A | * | 3/1993 | Ichikawa et al. | ......... 455/435.1 |
| 5,745,852 A | * | 4/1998 | Khan et al. | ................. 455/433 |
| 5,905,961 A | * | 5/1999 | Sanders et al. | .......... 455/456.2 |
| 5,982,762 A | * | 11/1999 | Anzai et al. | ................ 370/338 |
| 6,016,430 A | * | 1/2000 | Shinomiya | .................. 455/515 |
| 6,175,737 B1 | * | 1/2001 | Kao | ........................... 455/447 |
| 6,370,394 B1 | * | 4/2002 | Anttila | ....................... 455/417 |
| 6,381,457 B1 | * | 4/2002 | Carlsson et al. | ......... 455/435.2 |

FOREIGN PATENT DOCUMENTS

| | | |
|---|---|---|
| KR | 99-56233 | 7/1999 |
| WO | WO 95/01075 | 1/1995 |
| WO | WO 95/20300 | 7/1995 |

OTHER PUBLICATIONS

European Search Report and Annex, EP 00 31 0615 Sep. 19, 32002, Examiner Schut, G.

* cited by examiner

Primary Examiner—William Trost
Assistant Examiner—Brandon J. Miller
(74) Attorney, Agent, or Firm—Milbank, Tweed, Hadley & McCloy LLP

(57) ABSTRACT

A communicating apparatus which is connected to a communication line control device or a system for controlling communication of a plurality of terminals existing in a service zone formed by a plurality of base stations and is used for at least one of the plurality of base stations. The apparatus has an identification information allocating unit for allocating base station identification information for specifying an arbitrary one of the plurality of terminals on the basis of a predetermined condition to the arbitrary terminal at a timing of forming a link with the arbitrary terminal.

8 Claims, 12 Drawing Sheets

W-CDMA MOBILE COMMUNICATION SYSTEM CONFIGURATION OVER VIEW

FUNCTION BLOCK DIAGRAM OF TERMINAL IN THE PRESENT INVENTION'S W-CDMA MOBILE COMMUNICATION SYSTEM

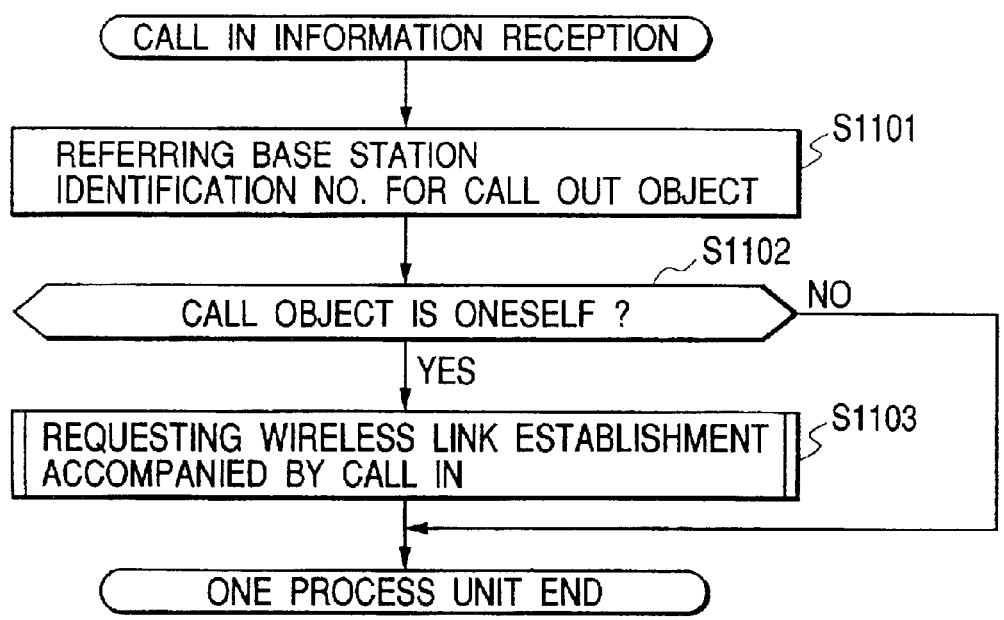

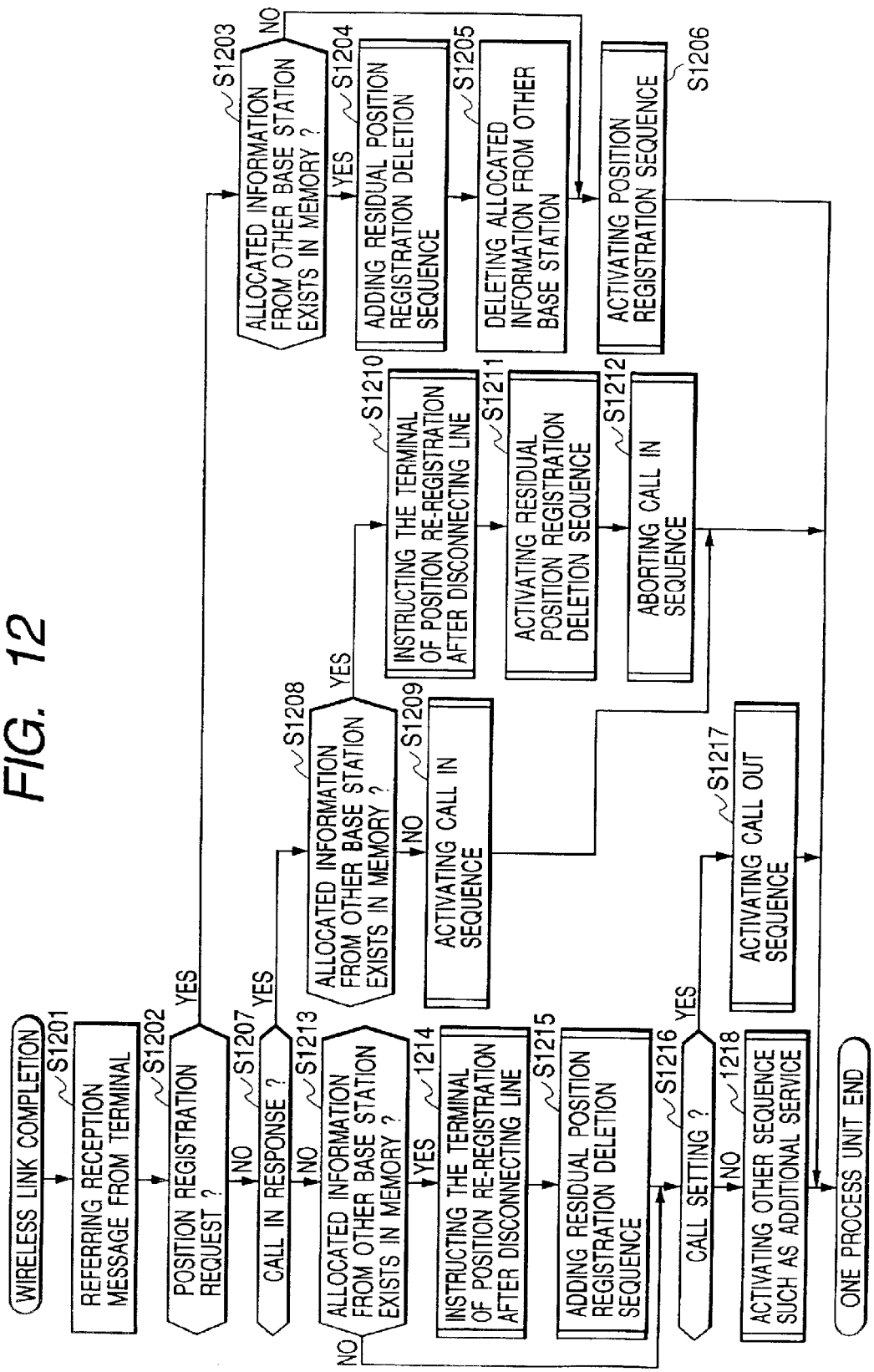

COMMUNICATING APPARATUS, COMMUNICATION SYSTEM, COMMUNICATING METHOD, AND STORAGE MEDIUM

BACKGROUND OF THE INVENTION

1. Field of the Invention

The invention relates to, for example, a technique for allocating an identifier for specifying a wireless terminal to each wireless terminal in order to control communication of a plurality of wireless terminals in a service zone which is formed by a plurality of base stations.

2. Related Background Art

For example, in a wireless communication system of the second generation (digital type) such as PHS, PDC, or the like, a wireless control device can specify a wireless terminal by a unique identifier (hereinafter, referred to as "ID unique to terminal") allocated fixedly to each wireless terminal.

However, if the ID unique to terminal is always used for specifying the wireless terminal, a risk such that a correspondence between the ID unique to terminal and user (subscriber of the present system) information of the wireless terminal to which the ID unique to terminal has been allocated is found out by a third party is high.

To solve such a problem, therefore, in recent years, a wireless communication system of the third generation such as IMT2000 (International Mobile Telecommunication 2000) or the like has been used. Such a wireless communication system uses a method of using a temporary wireless terminal identifier (hereinafter, referred to as a "temporary identifier") which is allocated by the communication carrier in place of the ID unique to terminal in the wireless communication system of the second generation. Thus, it is possible to prevent a situation such that the correspondence between the temporary identifier allocated to the wireless terminal and the user (subscriber of the present system) information of the wireless terminal is found out by a third party.

However, in the conventional method of specifying the wireless terminal used in the wireless communication system of the third generation as mentioned above, since the wireless control device needs to store correlation information between the fixed identifier (identifier fixedly allocated to the wireless terminal) and the temporary identifier (identifier temporarily allocated to the wireless terminal by the communication carrier), there are problems such that it is necessary to provide an extremely large capacity of memory for this purpose for the wireless control device and a load of the allocating process of the temporary identifier is large.

In the case where the wireless communication system of the third generation is used, for example, as a wireless communication system of a relatively small scale such as WLL, in-plant system, or the like, it results in a problem such that a scale of wireless control device is larger than that of ordinary exchange equipment.

SUMMARY OF THE INVENTION

The invention is made to eliminate the foregoing drawbacks and it is an object of the invention to provide a communicating apparatus, a communication system, and a communicating method, in which a capacity of a memory of a wireless control device can be reduced, a load of an allocating process of an identifier for specifying a wireless terminal can be reduced, and efficient wireless communication is realized, and to provide a storage medium in which processing steps for embodying them have been stored in a computer-readable state.

According to a preferred embodiment of the invention, the above object is accomplished by a communicating apparatus which is connected to a communication line control device or a system for controlling communication of a plurality of terminals existing in a service zone formed by a plurality of base stations and which is used for at least one of the plurality of base stations, comprising identification information allocating means for allocating base station identification information for specifying an arbitrary one of the plurality of terminals on the basis of a predetermined condition to the arbitrary terminal at a timing of forming a link with the arbitrary terminal.

According to another embodiment of the invention, the communicating apparatus further comprises: link establishment request receiving means for receiving, from the arbitrary terminal, a link establishment request using at least one of unique terminal information for specifying the arbitrary terminal, base station identification information allocated to the arbitrary terminal from a base station other than a self base station, and unique base station information for specifying the other base station; and link establishment processing means for executing a process for establishing a link with the arbitrary terminal on the basis of the reception information obtained by the link establishment request receiving means.

According to still another embodiment of the invention, there is provided a communicating method of forming a service zone by a plurality of wireless cells which are formed by a plurality of wireless base stations connected to a wireless line control device through a wire communication network, performing a wireless connection with wireless terminals existing in the service zone, and specifying each wireless terminal by using information other than unique terminal information for specifying each wireless terminal, comprising the step in which, at a timing when an arbitrary one of the plurality of wireless terminals forms a wireless link with an arbitrary one of the plurality of wireless base stations, the arbitrary wireless base station forms and allocates base station identification information other than the unique terminal information for specifying the arbitrary wireless terminal on the basis of a predetermined condition.

According to further another embodiment of the invention, there is provided a storage medium in which a processing program for embodying a function of the communicating apparatus in each of the embodiments has been stored in a computer-readable state.

Specifically speaking, for example, the service zone is formed by a plurality of wireless cells which are formed by a plurality of wireless base stations connected to the wireless line control device (communication line control device) through a wire communication network, a wireless connection is performed with the wireless terminals existing in the service zone, and when the wireless terminal is specified by using the identification information other than the terminal information unique to the wireless terminal (ID unique to terminal), the wireless base station allocates an identifier (base station identification information) as necessary at a timing when the wireless terminal forms the wireless link, and the correlation between the terminal information unique to the wireless terminal (ID unique to terminal) and the base station identification information (temporary identifier)

which is allocated by the wireless base station is managed by the wireless base station itself. Thus, the procedure such that the wireless line control device (network side) stores the correlation information between the terminal information unique to the wireless terminal (ID unique to terminal) and the temporary identifier as in the conventional apparatus becomes unnecessary. Thus, a capacity of the memory for storage of such correlation information can be reduced. There is no need to allocate the temporary identifier by the wireless line control device. The load of such a process can be also reduced.

BRIEF DESCRIPTION OF THE DRAWINGS

FIG. 11 is a flowchart for explaining the operation of the wireless terminal upon reception of a call in signal; and FIG. 12 is a flowchart for explaining the operation of the wireless base station upon completion of a wireless link.

DETAILED DESCRIPTION OF THE PREFERRED EMBODIMENTS

An embodiment of the invention will be described hereinbelow with reference to the drawings.

[Whole Configuration of the Embodiment]

Figure 1:
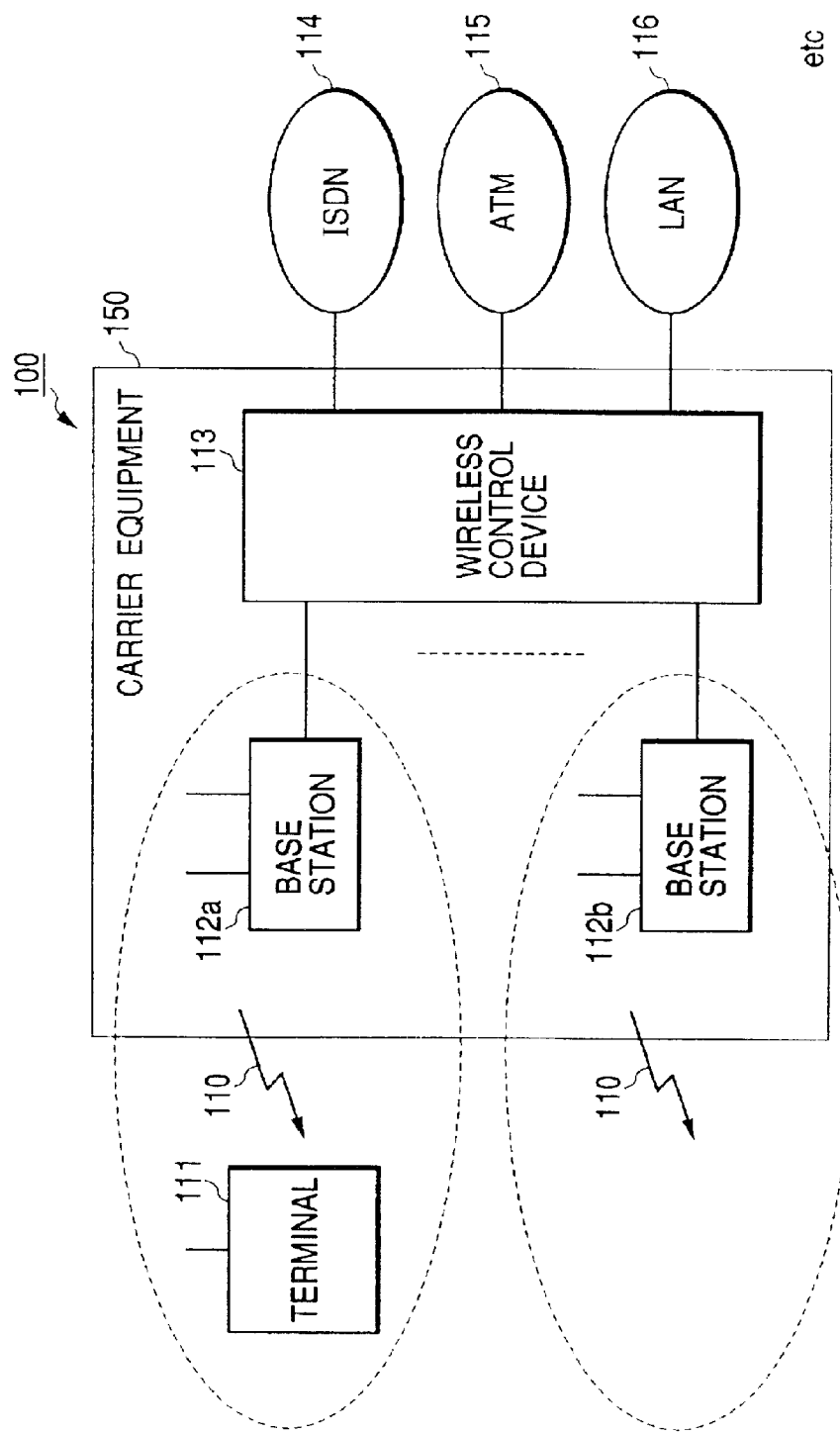
FIG. 1 is a block diagram showing a configuration of a communication system to which the invention is applied.

The invention is applied to a communication system 100 as shown in FIG. 1.

The communication system 100 is a wide band CDMA (W-CDMA: Wide band-Code Division Multiple Access) mobile communication system as a candidate of, for example, the wireless communication system of the third generation such as IMT2000 or the like. As shown in FIG. 1, the communication system 100 includes: a wireless terminal 111 which communicates with another wireless terminal (not shown) of the present system; wireless base stations 112a and 112b which communicate with the wireless terminal 111 or the like; a wireless control device 113 for controlling the communication between the wireless terminals of the present system; and an ISDN (Integrated Services Digital Network) 114, an ATM (Asynchronous Transfer Mode) 115, and an LAN (Local Area Network) 116 serving as connection wire networks of the wireless control device 113. The wireless base stations 112a and 112b and wireless control device 113 are provided as communication carrier equipment 150.

Although one wireless terminal 111 is shown as a wireless terminal and two wireless base stations 112a and 112b are shown as wireless base stations in FIG. 1 for simplicity of explanation, a plurality of wireless terminals and wireless base stations actually arbitrarily exist, respectively.

[Configuration of the Wireless Base Stations 112a and 112b]

Figure 2:
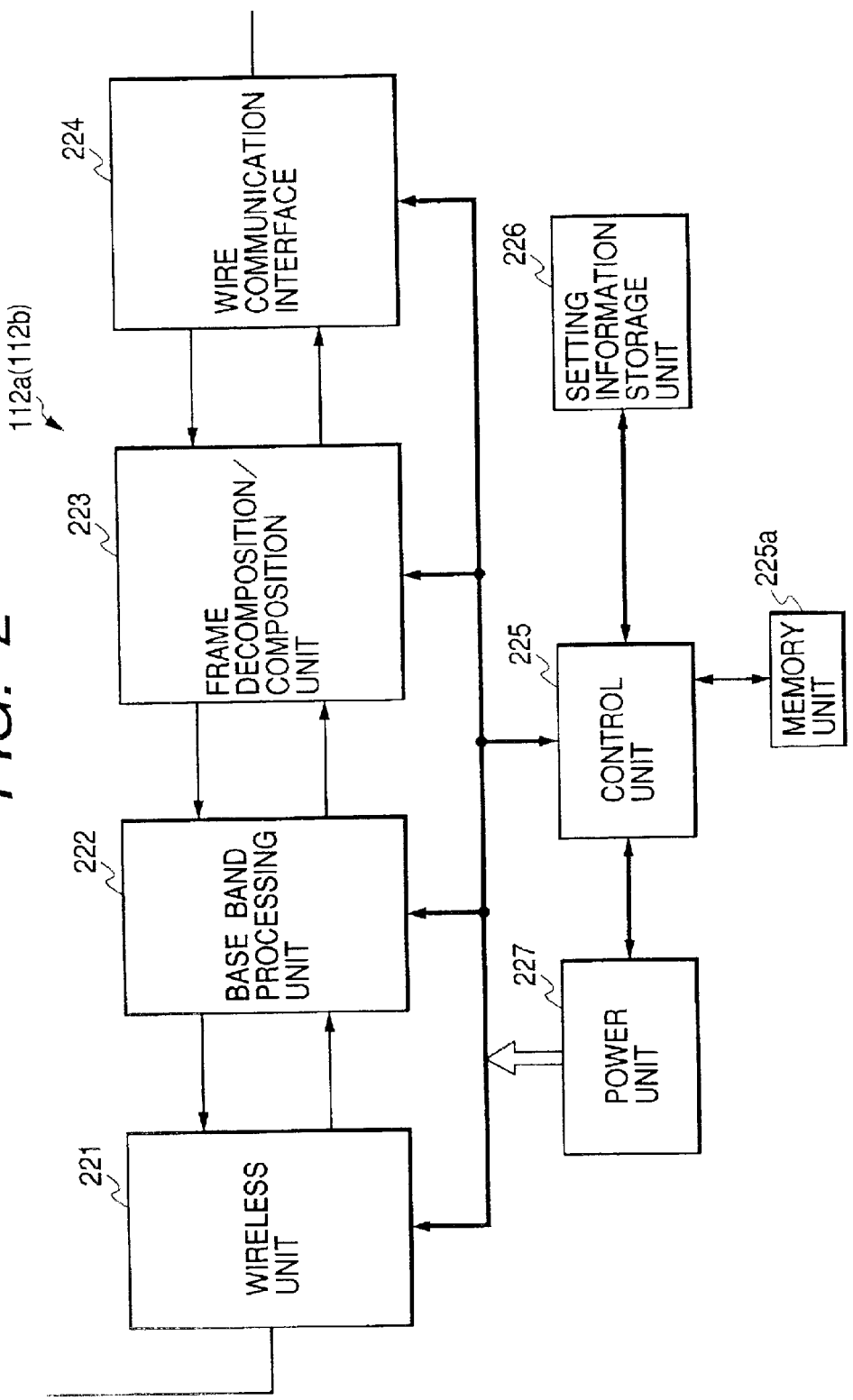
FIG. 2 is a block diagram showing a configuration of a wireless base station in the communication system.

Each of the wireless base stations 112a and 112b has a configuration as shown in FIG. 2.

For example, the wireless base station 112a comprises: a wireless unit 221; a base band processing unit 222; a frame decomposition/composition unit 223; a wire communication interface 224; a control unit 225; a setting information storage unit 226; and a power unit 227.

The wireless unit 221 performs wireless transmission and reception. For example, the wireless unit 221 receives data from the wireless terminal 111 in a wireless manner and transmits data from the base band processing unit 222 to the wireless terminal 111 in a wireless manner.

The base band processing unit 222 performs a demodulating process to the data received by the wireless unit 221 and supplies the processed reception data to the frame decomposition/composition unit 223. The base band processing unit 222 performs a modulating process to the data from the frame decomposition/composition unit 223 and supplies the processed data as transmission data to the wireless unit 221.

The frame decomposition/composition unit 223 performs a data decomposing process according to a predetermined frame format to the reception data from the base band processing unit 222 and supplies the processed data to the wire communication interface 224. The frame decomposition/composition unit 223 performs a data composing process according to a predetermined frame format to the data from the wire communication interface 224 and supplies the processed data to the base band processing unit 222.

The wire communication interface 224 is an interface for performing wire communication with the wireless control device 113, transmits the data from the frame decomposition/composition unit 223 to the wireless control device 113 in a wire manner, receives the data from the wireless control device 113 in a wireless manner, and supplies the received data to the frame decomposition/composition unit 223.

The control unit 225 performs an operation control, as will be explained hereinlater, of the whole wireless base station 112a (112b) on the basis of a program stored in a storage medium such as CD-ROM, semiconductor memory, or the like enclosed in a memory unit 225a. The setting information storage unit 226 is a memory for storing various setting information which is used in a control process or the like in the control unit 225.

Each of the component units 221 and 226 is made operative when a power source is supplied from the power unit 227 to the wireless base station 112a (112b).

[Configuration of the Wireless Terminal 111]

Figure 3:
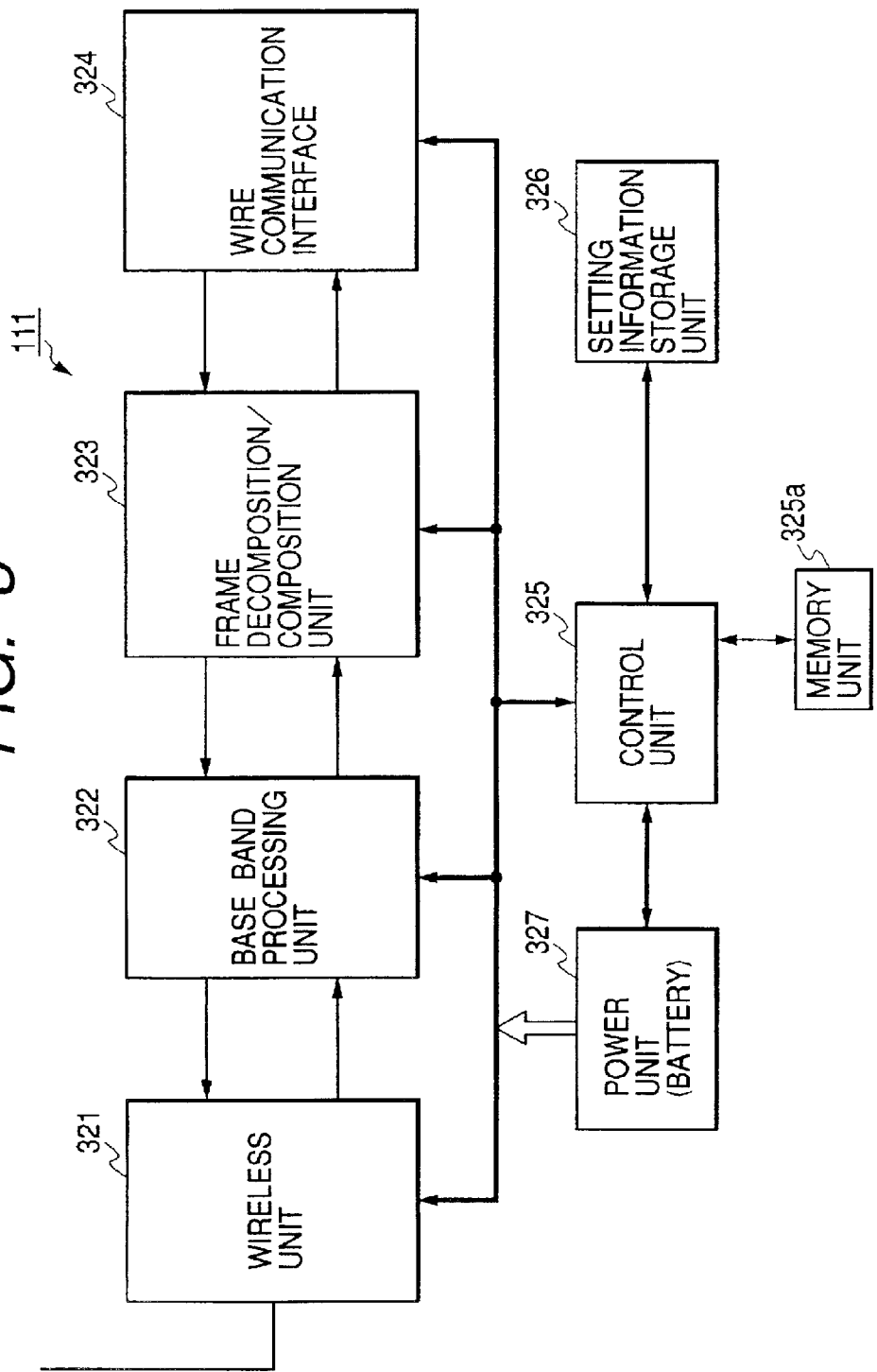
FIG. 3 is a block diagram showing a configuration of a wireless terminal in the communication system.

As shown in FIG. 3, the wireless terminal 111 comprises: a wireless unit 321; a base band processing unit 322; a frame decomposition/composition unit 323; a communication application 324; a control unit 325; a setting information storage unit 326; and a power unit (battery) 327.

The wireless unit 321 performs wireless transmission and reception. For example, the wireless unit 321 receives data from the wireless base station 112a in a wireless manner and transmits data from the base band processing unit 322 to the wireless base station 112a in a wireless manner.

The base band processing unit 322 performs a demodulating process to the data received by the wireless unit 321 and supplies the processed reception data to the frame decomposition/composition unit 323. The base band processing unit 322 performs a modulating process to the data from the frame decomposition/composition unit 323 and supplies the processed data as transmission data to the wireless unit 321.

The frame decomposition/composition unit 323 performs a data decomposing process according to a predetermined frame format to the reception data from the base band processing unit 322 and supplies the processed data to the communication application 324. The frame decomposition/composition unit 323 performs a data composing process according to a predetermined frame format to the data from the communication application 324 and supplies the processed data to the base band processing unit 322.

The communication application 324 is an application for performing a telephone function or the like such as call out or call in or the like to another wireless terminal.

The control unit 325 performs an operation control, as will be explained hereinlater, of the whole wireless terminal 111 on the basis of a program stored in various storage media such as CD-ROM, semiconductor memory, and the like enclosed in a memory unit 325a. The setting information storage unit 326 is a memory for storing various setting information which is used in a control process or the like in the control unit 325.

Each of the component units 321 and 326 is made operative when a power source is supplied from the power unit (battery) 327 to the wireless terminal 111.

[Operation of the Communication System 100]

Figure 4:
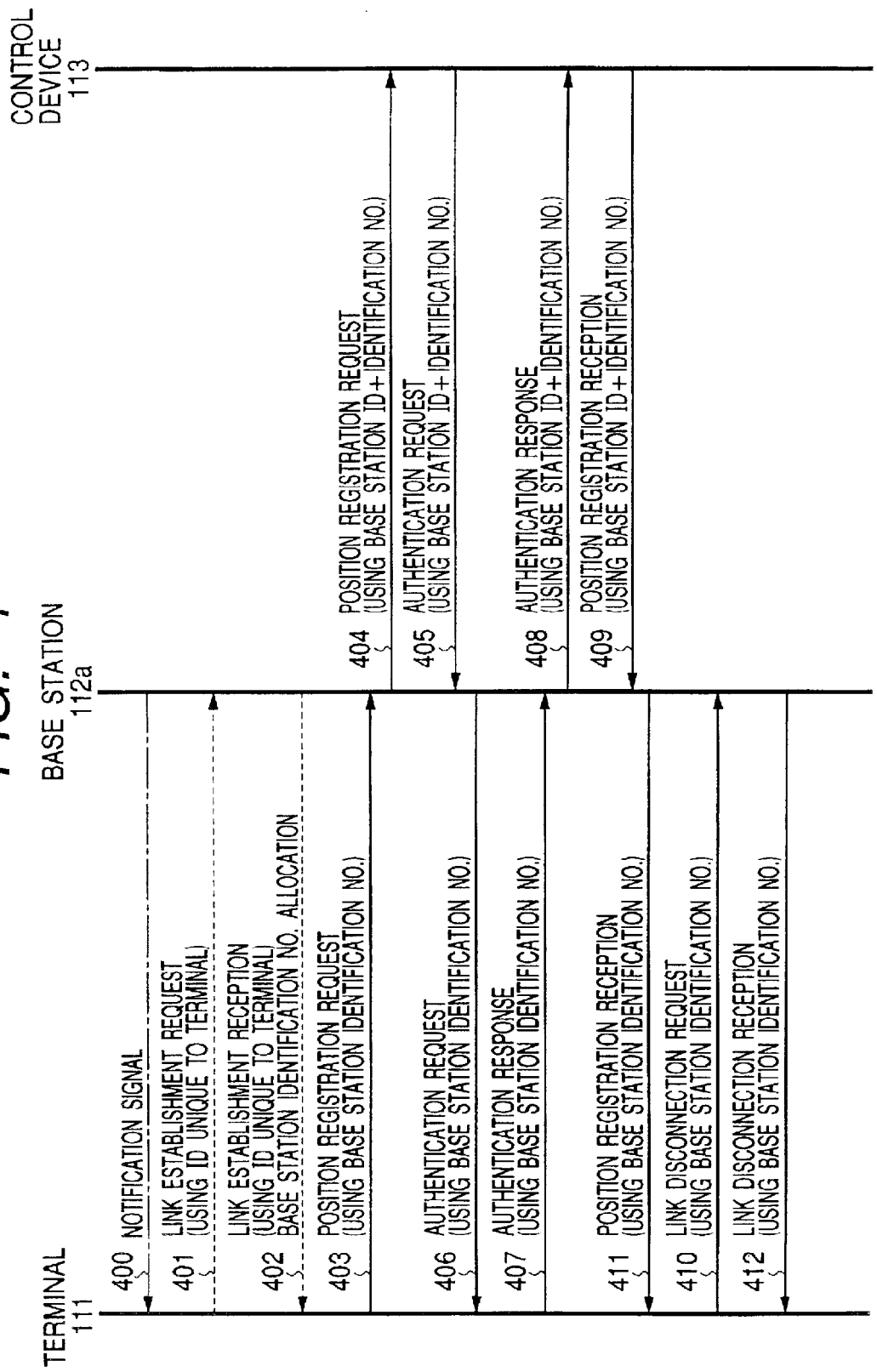
FIG. 4 is a diagram for explaining a position registration sequence (just after a turn-on of a power source) in the communication system.
Figure 5:
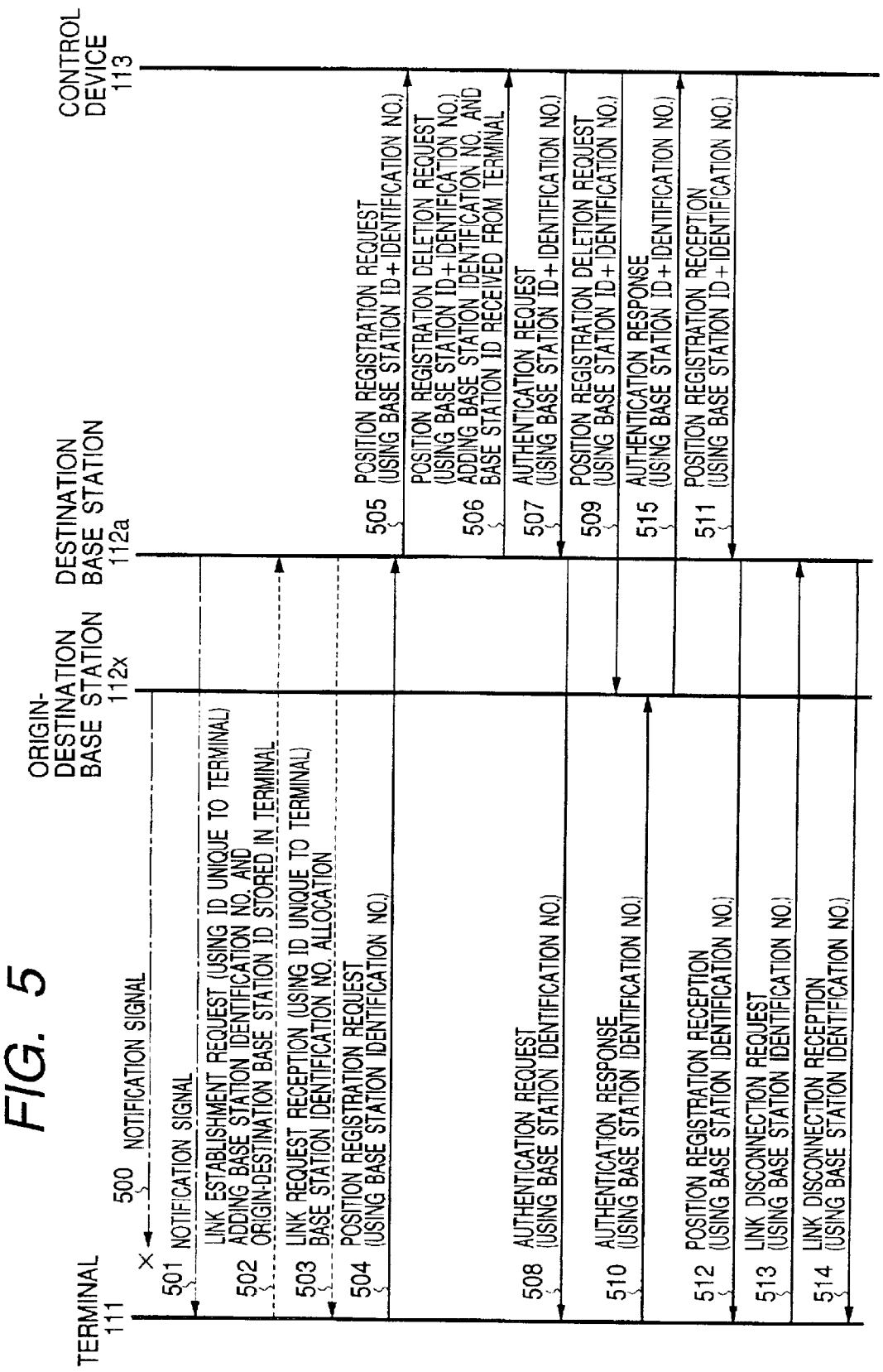
FIG. 5 is a diagram for explaining a position registration sequence (when the wireless terminal is moved) in the communication system.
Figure 6:
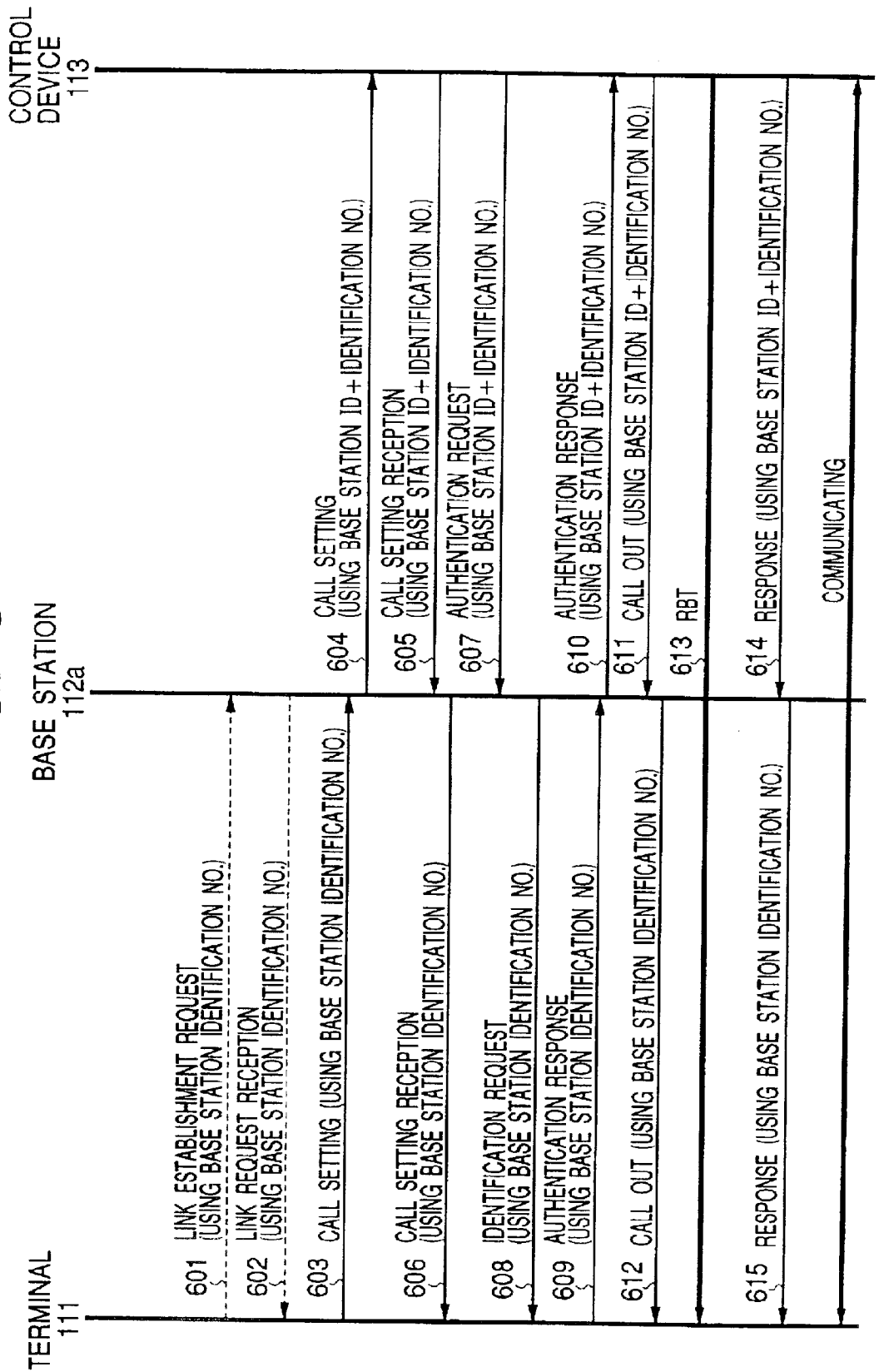
FIG. 6 is a diagram for explaining a transmission sequence in the communication system.
Figure 7:
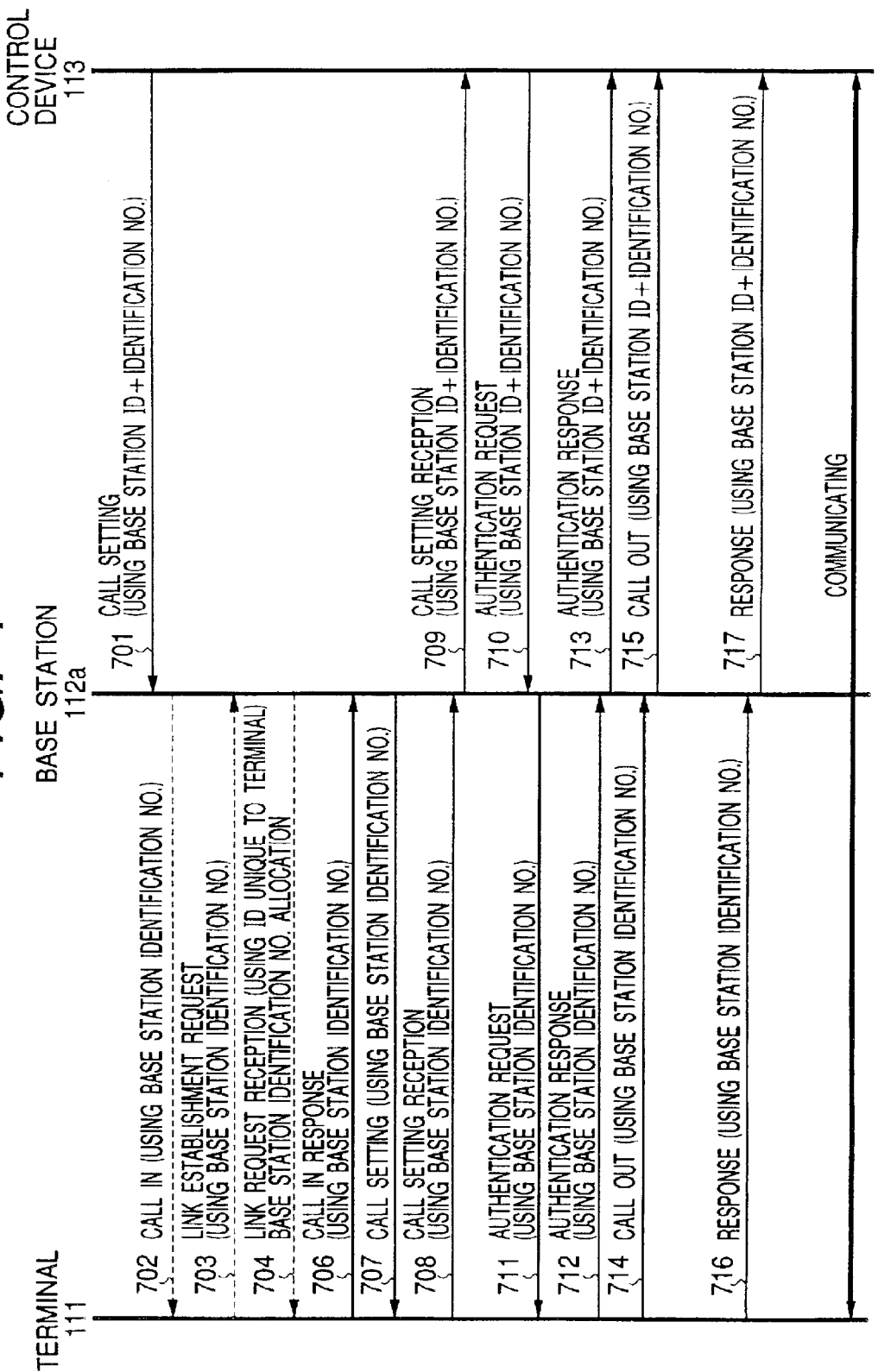
FIG. 7 is a diagram for explaining a reception sequence in the communication system.

FIG. 4 shows an example of a position registration sequence at the first time (state where a temporary identifier is not allocated to the wireless terminal 111, such as a state at the time of turn-on of a power source or the like). FIG. 5 shows an example of a position registration sequence accompanied by the movement of the wireless terminal 111. FIG. 6 shows an example of a transmission (call out) sequence of the wireless terminal 111. FIG. 7 shows an example of a reception (call in) sequence of the wireless terminal 111.

Figure 8:
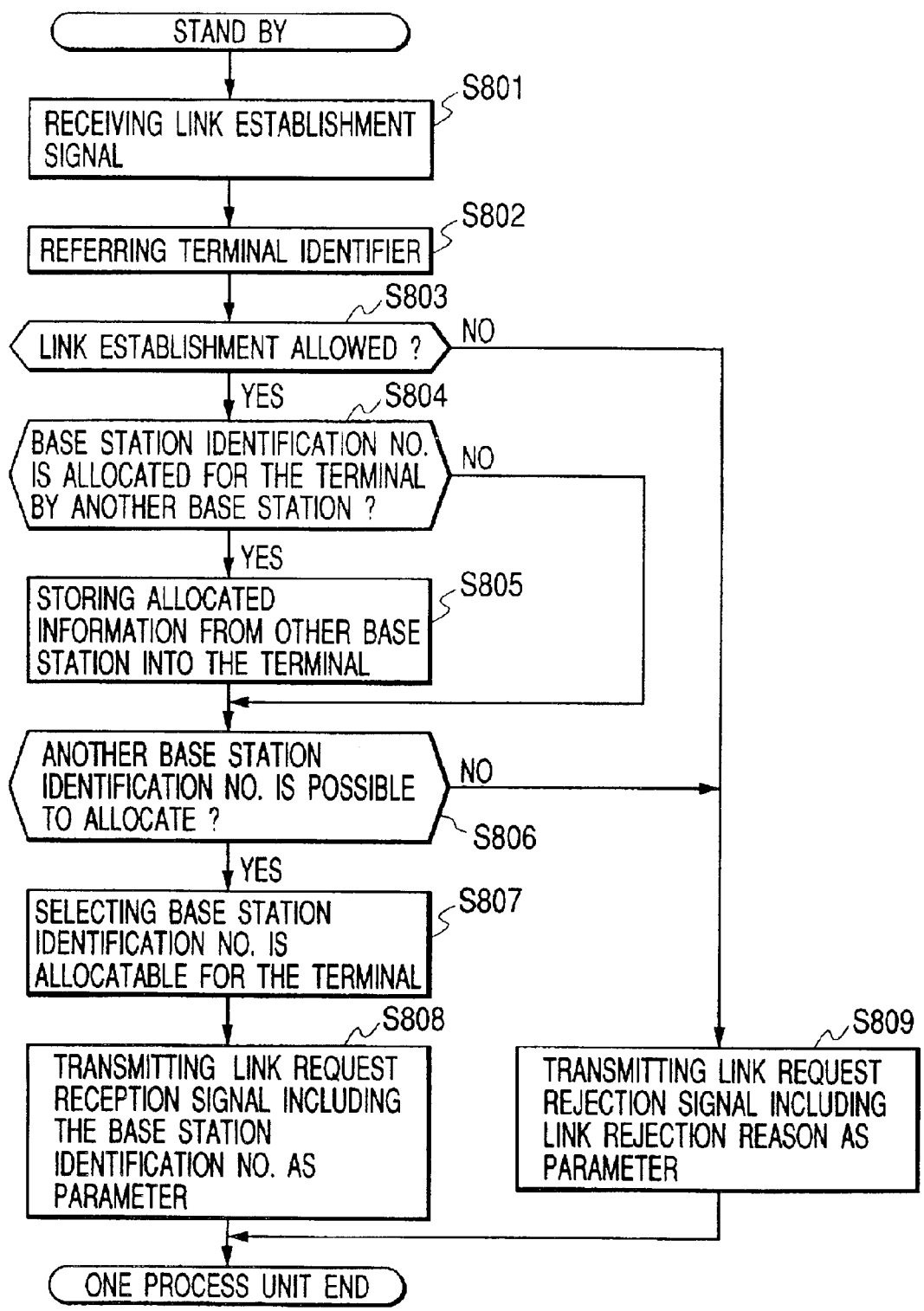
FIG. 8 is a flowchart for explaining the operation upon reception of a link establishment request signal in a standby status of the wireless base station.

FIGS. 8 and 12 show the operations of the wireless terminal 111 and wireless base stations 112a and 112b for realizing the sequences shown in FIGS. 4 and 7.

For simplicity of explanation, attention is paid to the wireless base station 112a and wireless terminal 111 among a plurality of wireless base stations and a plurality of wireless terminals and their operations will be explained.

(1) Operation of the Wireless Base Station 112a in the Standby Status: Refer to FIG. 8

In the wireless base station 112a in the standby mode, first, the wireless unit 221 receives a link establishment request signal (401 in FIG. 4, 502 in FIG. 5, 601 in FIG. 6, 703 in FIG. 7) from the wireless terminal 111 (step S801).

In the case where a base station identification ID (temporary identifier) has been allocated to the wireless terminal 111 from the wireless base station 112a (601 in FIG. 6, 703 in FIG. 7), the link establishment request signal at this time is a signal formed by using the base station identification ID. In the case where the base station identification ID is not allocated to the wireless terminal 111 from the wireless base station 112a (401 in FIG. 4) as in case of the timing just after the turn-on of the power source or the case where the base station identification ID has been allocated to the wireless terminal 111 from another wireless base station (502 in FIG. 5) due to the movement or the like of the wireless terminal 111, the link establishment request signal is a signal formed by using the ID unique to the wireless terminal 111 (ID unique to terminal). In the case where the base station identification ID has been allocated to the wireless terminal 111 from another wireless base station (502 in FIG. 5) due to the movement or the like of the wireless terminal 111, the identification information (base station ID) of another wireless base station and the base station identification ID allocated from another base station have been added to the link establishment request signal.

The control unit 225 subsequently refers to the terminal identifier notified by the link establishment request signal (step S802).

The terminal identifier indicates the ID unique to terminal of the wireless terminal 111 (in case of 401 in FIG. 4, 502 in FIG. 5) or the base station identification No. (in case of 601 in FIG. 6, 703 in FIG. 7) which has already been allocated to the wireless terminal 111 by the wireless base station 112a.

Subsequently, the control unit 225 discriminates whether a link of an individual wireless line (wireless link) can be made between the wireless base station 112a and wireless terminal 111 or not. Specifically speaking, whether the connection can be performed or not is discriminated on the basis of the terminal identifier in step S802 and the presence or absence of the wireless resources for setting the individual wireless line is discriminated (step S803).

If it is determined that the wireless link is impossible as a result of the discrimination in step S803, the control unit 225 returns a link request rejection signal to which a link rejection reason has been added as a parameter to the wireless terminal 111 through the wireless unit 221 (step S809). The present processing routine is finished.

If it is determined that the wireless link can be made as a result of the discrimination in step S803, the control unit 225 further checks the parameter of the link establishment request signal received in step S801 and discriminates whether the wireless terminal 111 is in a status where the base station identification No. has already been allocated from another wireless base station (wireless base station 112b or the like) or not (discrimination about whether it is the case of 502 in FIG. 5) (step S804).

As a result of the discrimination, if it is determined that the wireless terminal 111 is in the status where the base station identification No. is not allocated from another wireless base station, next step S805 is skipped and the processing routine advances directly to step S806.

As a result of the discrimination in step S804, if it is determined that the wireless terminal 111 is in the status where the base station identification No. has already been allocated from another wireless base station, namely, in the case where the base station identification No. (base station identification ID allocated to the wireless terminal 111 from another wireless base station) and the base station ID showing the wireless base station (origin-destination base station) have been added to the link establishment request signal 502 from the wireless terminal 111 as shown in FIG. 5, the control unit 225 stores the base station identification No. and the origin-destination base station ID into the setting information storage unit 226 (step S805).

After completion of the process in step S805, or if it is determined in step S804 that the wireless terminal 111 is in the status where the base station identification No. is not allocated from another wireless base station, the control unit 225 discriminates whether the wireless base station 112a can newly allocate a base station identification No. to the wireless terminal 111 or not (step S806).

For example, a plurality of base station identification Nos. have previously been stored in the setting information storage unit 226 and information such as base station identification No. which has already been allocated (which is being used) to the wireless terminal, base station identification No. which is not yet allocated to any of the wireless terminals, and the like among those base station identification Nos. can be identified. Therefore, if the base station identification No. which is not used yet does not exist among the plurality of base station identification Nos. in the setting information storage unit 226, it is determined that the base station identification No. cannot be allocated to the object wireless terminal.

If it is determined that it cannot be allocated as a result of the discrimination in step S806, the control unit 225 returns the link request rejection signal to which the link rejection reason (the base station identification No. cannot be newly allocated) has been added as a parameter to the wireless terminal 111 through the wireless unit 221 (step S809). The present processing routine is finished.

If it is determined that it is allocatable as a result of the discrimination in step S806, the control unit 225 selects the base station identification No. which is allocatable for the wireless terminal 111 (step S807) and returns the link request reception signal (402 in FIG. 4, 503 in FIG. 5) to which the selected base station identification No. has been added as a parameter (step S808). After that, the processing routine is finished.

When the wireless link is established in step S808 as mentioned above, although the details will be explained hereinlater, a position registration request (403 in FIG. 4, 504 in FIG. 5) using the allocated base station identification No. from the wireless base station 112 is made from the wireless terminal 111 to the wireless base station 112a.

Figure 9:
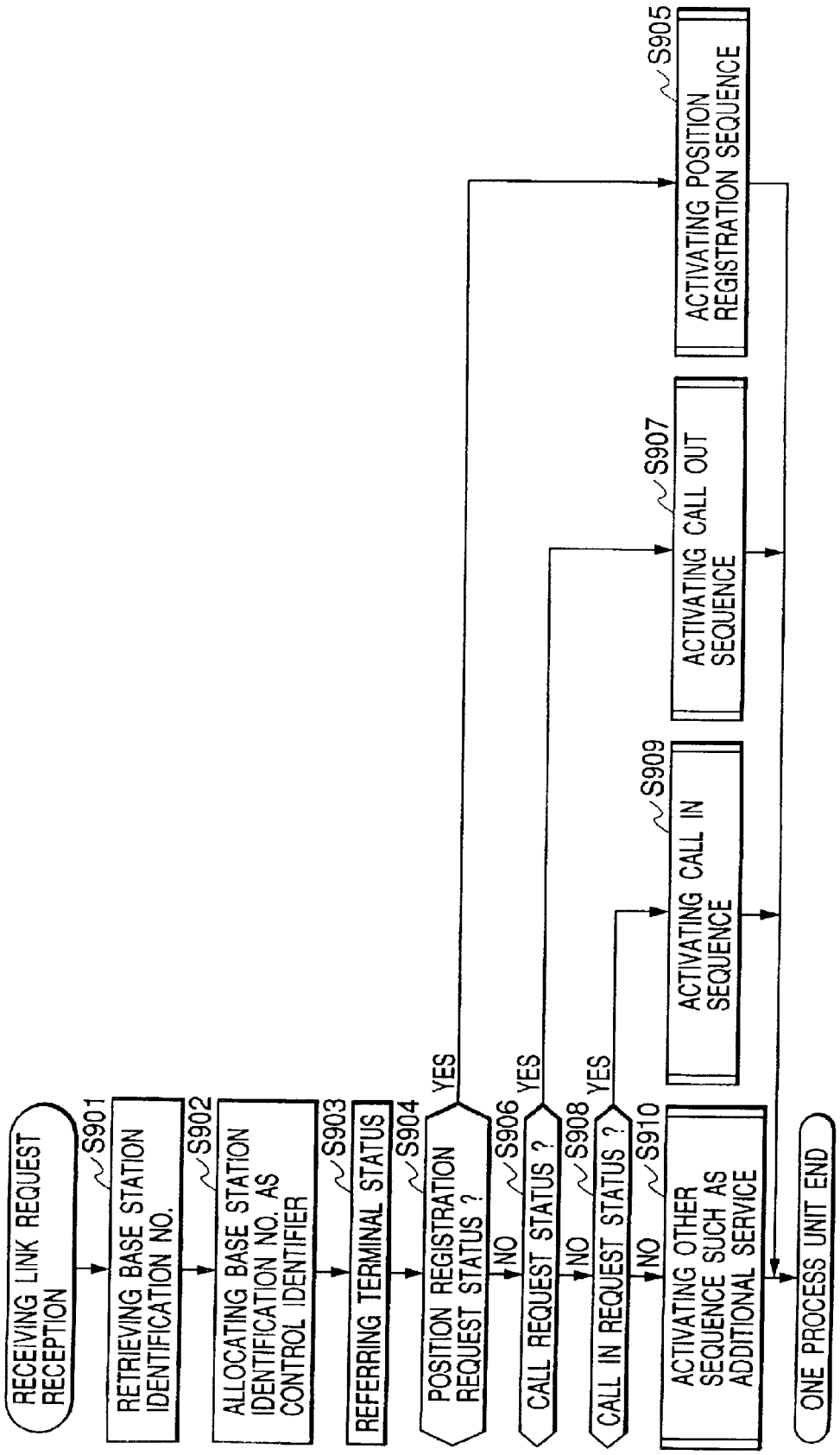
FIG. 9 is a flowchart for explaining the operation of the wireless terminal upon reception of a link request reception signal.

(2) The Operation of the Wireless Terminal 111 upon Reception of the Link Request Reception Signal (402 in FIG. 4, 503 in FIG. 5, 602 in FIG. 6, 704 in FIG. 7): Refer to FIG. 9

First, when the wireless unit 321 receives the link request reception signal (402 in FIG. 4, 503 in FIG. 5, 602 in FIG. 6, 704 in FIG. 7) from the wireless base station 112a, the control unit 325 retrieves the base station identification No. notified by the link request reception signal (step S901) and assigns the base station identification No. as a control identifier which will be used in future under the wireless base station (wireless base station 112a) shown by the base station identification No. (step S902).

Subsequently, the control unit 325 checks a status of the wireless terminal 111 (step S903) and executes the process according to the check result (steps S904, S910).

That is, if the wireless terminal 111 is in a position registration request status for the wireless base station 112a (403 in FIG. 4, 504 in FIG. 5) (step S904), the control unit 325 executes the operation control according to a position registration sequence (403 and 412 in FIG. 4, 504 and 514 in FIG. 5) (step S905).

When the wireless terminal 111 is in a call request status for another wireless terminal through the wireless base station 112a (603 in FIG. 6) (step S906), the control unit 325 executes the operation control according to a call out sequence (603 and 615 in FIG. 6) (step S907).

When the wireless terminal 111 is in a call in request status for another wireless terminal through the wireless base station 112a (706 in FIG. 7) (step S908), the control unit 325 executes the operation control according to a call in sequence (706 and 717 in FIG. 7) (step S909).

When the wireless terminal 111 is not in a status of a discrimination object in steps S904, S906, and S908, the control unit 325 executes the operation control according to a sequence corresponding to the status such as additional service or the like of the wireless terminal 111 (step S910).

After completion of the operation control according to the sequence corresponding to the status of the wireless terminal 111 as mentioned above, the present processing routine is finished.

Figure 10:
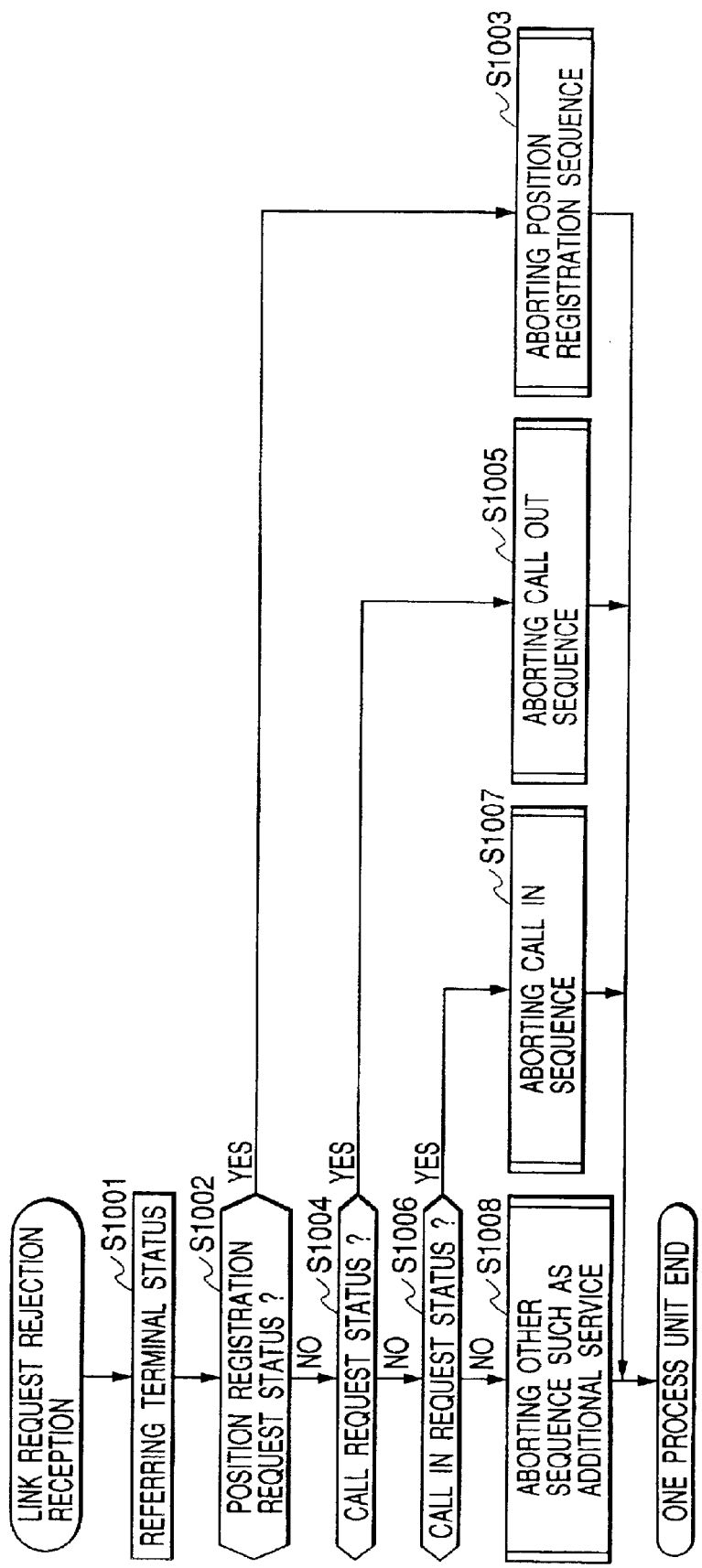
FIG. 10 is a flowchart for explaining the operation of the wireless terminal upon reception of a link request rejection signal.

(3) Operation of the Wireless Terminal 111 upon Reception of a Link Request Reception Rejection Signal: Refer to FIG. 10

First, when the wireless unit 321 receives the link request reception rejection signal from the wireless base station 112a, the control unit 325 checks the status of the wireless terminal 111 (step S1001) and executes the process according to the check result (steps S1002, S1008).

That is, when the wireless terminal 111 is in the position registration request status for the wireless base station 112a (403 in FIG. 4, 504 in FIG. 5) (step S1002), the control unit 325 aborts the operation control according to the position registration sequence (403 and 412 in FIG. 4, 504 and 514 in FIG. 5) (step S1003).

When the wireless terminal 111 is in the call out request status to another wireless terminal through the wireless base station 112a (603 in FIG. 6) (step S1004), the control unit 325 aborts the operation control according to the call out sequence (603 and 615 in FIG. 6) (step S1005).

When the wireless terminal 111 is in the call in request status from another wireless terminal through the wireless base station 112a (706 in FIG. 7) (step S1006), the control unit 325 aborts the operation control according to the call in sequence (706 and 717 in FIG. 7) (step S1007).

When the wireless terminal 111 is not in the status of the discrimination object in steps S1002, S1004, and S1006, the control unit 325 aborts the operation control according to the sequence such as an additional service or the like which is being executed at present in the wireless terminal 111 (step S1008).

After the operation control according to the sequence which is being executed at present in correspondence to the status of the wireless terminal 111 as mentioned above was aborted, the present processing routine is finished.

(4) Operation of the Wireless Terminal 111 upon Call in: Refer to FIG. 11

First, the wireless unit 321 receives a call in (702 in FIG. 7) from another wireless terminal through the wireless base station 112a.

At this time, the call in is performed by using the base station identification ID allocated to the object wireless terminal (wireless terminal 111 here) of the relevant call in from the wireless base station 112a.

Subsequently, the control unit 325 refers to the base station identification No. notified by the call in (step S1101) and discriminates whether the call object is oneself (wireless terminal 111) or not (step S1102).

If the call object is not oneself (wireless terminal 111) as a result of the discrimination, namely, if the base station identification No. of the call in is not the base station identification No. allocated to oneself (wireless terminal 111), the present processing routine is finished as it is.

If the call object is oneself (wireless terminal 111) as a result of the discrimination in step S1102, namely, if the base station identification No. of the call in is the base station identification No. allocated to oneself (wireless terminal 111), the control unit 325 transmits the wireless link establishment request (703 in FIG. 7) for the call in to the destination wireless base station 1112a of the call in through the wireless unit 321 (step S1103). After that, the present processing routine is finished.

(5) Operation of the Wireless Base Station 112a in the Wireless Link Completion Status: Refer to FIG. 12

First, when the wireless base station 112a is in the status where the wireless link with the wireless terminal 111 has been established by the processes shown in FIG. 8, if the wireless unit 227 receives a message (position registration request 403 in FIG. 4, position registration request 504 in FIG. 5, call setting 603 in FIG. 6, and call in response 706 in FIG. 7) from the wireless terminal 111, the control unit 225 checks the contents of the reception message (step S1201).

The control unit 225 discriminates whether the reception message is the position registration request message or not (step S1202).

If it is determined that the reception message is the position registration request message as a result of the discrimination in step S1202, the control unit 225 discriminates whether the wireless terminal 111 as an origin-destination of the position registration request message has already received the allocation of the identifier from another wireless base station (wireless base station 111x in FIG. 5) before or not (whether the wireless terminal 111 has already been registered or not) on the basis of the information stored in the setting information storage unit 226 at the time of reception of the wireless link request in the processes shown in FIG. 8 (refer to step S805 in FIG. 8) (step S1203).

If it is determined as a discrimination result that the wireless terminal 111 is not registered yet, next steps S1204 and S1205 are skipped and the processing routine directly advances to step S1206.

If it is determined as a discrimination result in step S1203 that the wireless terminal 111 has already been registered, namely, if the base station identification ID has been allocated to the wireless terminal 111 from another wireless base station due to the movement or the like of the wireless terminal 111 (502 in FIG. 5), the control unit 225 executes the operation control according to a residual position registration deletion processing sequence (506, 509 in FIG. 5) (step S1204), thereby deleting the allocated information of the identifier for the wireless terminal 111 stored in another wireless base station (wireless base station 111x) (step S1205).

Specifically speaking, the control unit 225 transmits a position registration deletion request (506 in FIG. 5) to the wireless control device 113 through the wire communication interface 224. Thus, the position registration deletion request (506 in FIG. 5) is transmitted to another wireless base station (origin-destination wireless base station 112x) to which the base station identification ID was allocated from the wireless control device 113 to the wireless terminal 111. Another wireless base station (origin-destination wireless base station 112x) which received the position registration deletion request deletes (registration deletion) the base station identification ID allocated to the wireless terminal 111 which has temporarily stored in the setting information storage unit (equivalent to the setting information storage unit 226 in FIG. 2) and managed in a manner similar to the wireless base station 112a. Therefore, after that, the registration deleted base station identification ID is handled as an ID which is allocatable for another wireless terminal.

After completion of the process in step S1205 or if it is determined in step S1203 that the wireless terminal 111 is not registered yet, the control unit 225 executes the operation control according to the position registration sequence (404 and 412 in FIG. 4, 505, 508, and 514 in FIG. 5) (step S1206).

Particularly, here, as identification information of the wireless terminal 111 between the control unit 225 and wireless control device 113, the control unit 225 transmits the position registration request (404 in FIG. 4, 505 in FIG. 5) to which the base station identification No. allocated to the wireless terminal 111 has been added to the wireless control device 113 through the wire communication interface 224 together with the identifier (base station ID) unique to the wireless base station 112a. The control unit 225 temporarily stores the ID unique to terminal of the wireless terminal 111 to which the base station identification No. has been allocated and the base station identification No. into the setting information storage unit 226 so as to be concerned with each other and manages them.

After completion of the process in step S1206, the present processing routine is finished.

If it is decided that the reception message is not the position registration request message as a result of the discrimination in step S1202 mentioned above, the control unit 225 discriminates whether the reception message is a call in response message or not (step S1207).

If it is decided that the reception message is the call in response message (call in response 706 in FIG. 7) as a discrimination result in step S1207, the control unit 225 discriminates whether the origin-destination wireless terminal 111 of the call in response message has already received the allocation of the identifier from another wireless base station before or not (whether the wireless terminal 111 has already been registered or not) on the basis of the information stored in the setting information storage unit 226 upon reception of the wireless link request in the processes shown in FIG. 8 (refer to step S805 in FIG. 8) (step S1208).

If the wireless terminal 111 is not registered yet as a discrimination result in step S1208, the control unit 225 executes the operation control according to the call in sequence (706 and 711 in FIG. 7) (step S1209). After that, the present processing routine is finished.

If it is decided that the wireless terminal 111 has already been registered as a discrimination result in step S1208, the control unit 225 instructs the wireless terminal 111 through the wireless unit 221 to again register the position after the line disconnection (step S1210).

The control unit 225 executes the operation control according to the residual position registration deletion processing sequence in a manner similar to steps S1204 and S1205 mentioned above, thereby deleting the identifier allocated information for the wireless terminal 111 stored in another wireless base station (step S1211). The control unit 225 aborts the call in sequence and instructs the wireless terminal 111 to disconnect the wireless line through the wireless unit 221 (step S1212). After that, the processing routine is finished.

If the reception message is not the call in response message as a discrimination result in step S1207 mentioned above, the control unit 225 discriminates whether the origin-destination wireless terminal 111 of the call in response message has received the allocation of the identifier from another wireless base station before or not (whether the wireless terminal 111 has already been registered or not) on the basis of the information stored in the setting information storage unit 226 upon reception of the wireless link request in the processes shown in FIG. 8 (refer to step S805 in FIG. 8) (step S1213).

If the wireless terminal 111 is not registered yet as a discrimination result, next steps S1214 and S1215 are skipped and the processing routine advances directly to step S1216.

If the wireless terminal 111 has already been registered as a discrimination result in step S1213, the control unit 225 instructs the wireless terminal 111 to again register the position after the line disconnection through the wireless unit 221 (step S1214).

The control unit 225 executes the operation control according to the residual position registration deletion processing sequence in a manner similar to steps S1204 and S1205 mentioned above, thereby deleting the identifier allocated information for the wireless terminal 111 stored in another wireless base station (step S1215).

After completion of the process in step S1215 or if it is determined in step S1213 that the wireless terminal 111 is not registered yet, the control unit 225 discriminates whether the reception message is the call setting message (call setting 603 in FIG. 6) or not (step S1216).

If it is determined as a discrimination result in step S1216 that the reception message is the call setting message, the control unit 225 executes the operation control according to the call out sequence (603 and 615 in FIG. 6) (step S1217). After that, the present processing routine is finished.

If it is decided that the reception message is not the call setting message as a discrimination result in step S1216, namely, if the reception message is none of the position registration request message, call setting message, and call in response message (position registration request 403 in FIG. 4, position registration request 504 in FIG. 5, call setting 603 in FIG. 6, and call in response 706 in FIG. 7), the control unit 325 executes the operation control such as an additional service or the like according to the sequence corresponding to the reception message (step S1218). After that, the present processing routine is finished.

As mentioned above, according to the embodiments, when the wireless link is successfully established between the wireless terminal 111 and wireless base station 112a for the first time, the wireless base station 112a allocates the base station identification No. as an identifier to the wireless terminal 111 as necessary (in the case where the wireless base station 112a is in a status where the base station identification ID is allocatable, the case where the base station identification ID is not allocated to the wireless terminal 111 from a wireless base station other than the wireless base station 112a, or the like) (refer to 402 in FIG. 4 and 704 in FIG. 7).

At this time, if another base station identification No. has already been allocated to the wireless terminal 111 from another wireless base station 112x, the wireless base station 112a for newly allocates the base station identification No. stores the base station identification No. which has already been allocated to the wireless terminal 111 and the information of the wireless base station 111x which allocated it, and the relevant residual information is deleted from the wireless base station 112x having the residual information (information of the base station identification No. which has already been allocated to the wireless terminal 111) according to the situation by the wire communication sequence through the wireless control device 113 (refer to 506 and 509 in FIG. 5).

According to the embodiments, therefore, the automatic management of the base station identification No. (temporary identifier) which is used between the wireless terminal 111 and wireless base station 112a can be realized by the control only between the wireless terminal 111 and wireless base station 112a independent of the wireless control device 113. There is no need to increase a capacity of the management memory or the like of the wireless control device 113 for the purpose of management of the temporary identifier as in the conventional apparatus.

Since the operation at the time of the wireless link between another wireless terminal and the wireless base station 112a, the wireless link between the wireless terminal 111 and another wireless base station, or the like is similar to that at the time of the wireless link between the wireless terminal 111 and wireless base station 112a in the foregoing embodiments, its detailed description is omitted.

In the embodiments, although the wide band CDMA (W-CDMA) mobile communication system as a candidate of the IMT2000 system has been applied as a communication system 100, the invention is not limited to it. For example, it is effective even if the invention is applied to a system such as narrow band CDMA type mobile communication system, system by the GSM (Global System for Mobile Communication), system by the PDC, or the like which intends to realize the improvement of security by allocating the temporary terminal identifier.

The object of the invention can be also accomplished by a method whereby a storage medium in which program codes of software for realizing the functions of the host and terminal in the foregoing embodiments have been stored is supplied to a system or an apparatus, a computer (or a CPU or an MPU) of the system or apparatus reads out the program codes stored in the storage medium and executes them.

In this case, the program codes themselves read out from the storage medium realize the functions of the embodiments and the storage medium in which the program codes have been stored constructs the invention.

As a storage medium for supplying the program codes, it is possible to use an ROM, a floppy disk, a hard disk, an optical disk, a magnetooptic disk, a CD-ROM, a CD-R, a magnetic tape, a non-volatile memory card, or the like.

The invention also incorporates not only a case where the functions of the embodiments are realized by a method whereby a computer executes the read-out program codes but also a case where the OS or the like which is operating on a computer executes a part or all of the actual processes on the basis of instructions of the program codes and the functions of the embodiments are realized by those processes.

Further, the invention also incorporates a case where the program codes read out from the storage medium are written in a memory equipped for a function expanding board inserted in a computer or a function expanding unit connected to a computer and, thereafter, a CPU or the like equipped for the function expanding board or function expanding unit executes a part or all of the actual processes on the basis of instructions of the program codes, and the functions of the embodiments are realized by those processes.

As described above, according to the embodiments, the base station applies the identifier (base station identification information) as necessary at the timing when the terminal existing in the service zone forms a link (configuration in which the task for identifier allocation is allocated to the base station). Therefore, by using the base station identification information as a temporary terminal identifier, the processing load of the communication line control device (network side) can be reduced while improving the security of communication. Further, a capacity of the memory or the like for allocation management of the temporary terminal identifier in the communication line control device can be reduced. Thus, even in a small scale system such as an in-plant system or the like, the costs of the whole system can be reduced.

What is claimed is:

1. A wireless system comprising a first and a second base stations, wherein said first base station comprises memory means for storing first identification information allocated by said first base station for specifying a terminal, and wherein said second base station comprises:

allocation means for allocating second identification information to the terminal for specifying the terminal; and request means for requesting, in accordance with a signal received from the terminal and including identification information for specifying the first base station, the first base station to release the first identification information allocated by said first base station and stored in said memory means.

2. A wireless system according to claim 1, wherein said second base station comprises notifying means for notifying a control apparatus in the wireless system about identification information of the second base station and the second identification information.

3. A wireless system according to claim 1, wherein said first base station is enabled to allocate the first identification information to another terminal in response to a request of releasing the first identification information.

4. A method of allocating identification information to a terminal in a wireless system, comprising the steps of:

allocating first identification information by a first base station to the terminal for specifying the terminal;

storing the first identification information in the first base station;

allocating second identification information by a second base station to the terminal for specifying the terminal; and requesting from the second base station, in accordance with a signal received from the terminal and including identification information for specifying the first babe station, the first base station to release the first identification information allocated by the first base station.

5. A method according to claim 4, further comprising the step of notifying a control apparatus in the wireless system about identification information of the second base station and the second identification information.

6. A wireless system according to claim 1, wherein said second base station comprises receiving means for receiving from the terminal the first identification information, and said request means requests the first base station to release the first identification information in accordance with the first identification information received by said receiving means.

7. A method according to claim 4, further comprising the step of enabling the first base station to allocate the first identification information to another terminal in response to a request of releasing the first identification information.

8. A method according to claim 4, further comprising the step of receiving at the second base station from the terminal the first identification information, and wherein said requesting step requests the first base station to release the first identification information in accordance with the first identification information received in said receiving step.

* * * * *

UNITED STATES PATENT AND TRADEMARK OFFICE
CERTIFICATE OF CORRECTION

PATENT NO. : 6,915,131 B2  Page 1 of 1
APPLICATION NO. : 09/728643
DATED : July 5, 2003
INVENTOR(S) : Hamada It is certified that error appears in the above-identified patent and that said Letters Patent is hereby corrected as shown below:

On the TITLE PAGE, add:

-- (30) Foreign Application Priority Data

Dec. 6, 1999 (JP) ......... 11-346223 --

Claim 4, column 13, line 31, change "terminal:" to read:
-- terminal; --

Claim 4, column 14, line 7, change "first babe" to read:
-- first base --

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,915,131 B2
APPLICATION NO. : 09/728643
DATED : July 5, 2005
INVENTOR(S) : Hamada It is certified that error appears in the above-identified patent and that said Letters Patent is hereby corrected as shown below:

On the TITLE PAGE, add:

-- (30) Foreign Application Priority Data

Dec. 6, 1999 (JP) ......... 11-346223 --

Claim 4, column 13, line 31, change "terminal:" to read:
-- terminal; --

Claim 4, column 14, line 7, change "first babe" to read:
-- first base --

This certificate supersedes Certificate of Correction issued May 29, 2007.

Signed and Sealed this

Nineteenth Day of June, 2007

JON W. DUDAS
*Director of the United States Patent and Trademark Office*